US008341599B1

(12) United States Patent
Angalet et al.

(10) Patent No.: US 8,341,599 B1
(45) Date of Patent: Dec. 25, 2012

(54) ENVIRONMENTS SHARING REMOTE MOUNTED MIDDLEWARE

(75) Inventors: Richard C. Angalet, Louisburg, KS (US); James G. Crumpler, Ascot Vale (AU); Donald B. Roth, Overland Park, KS (US); Christopher Patrick Schreck, Olathe, KS (US); Jeffrey Lynn Torchia, Olathe, KS (US); William P. Woltkamp, Flower Mound, TX (US)

(73) Assignee: Sprint Communications Company L.P., Overland Park, KS (US)

( * ) Notice: Subject to any disclaimer, the term of this patent is extended or adjusted under 35 U.S.C. 154(b) by 1445 days.

(21) Appl. No.: 11/936,077

(22) Filed: Nov. 6, 2007

(51) Int. Cl.
*G06F 9/44* (2006.01)

(52) U.S. Cl. ......... 717/121; 717/104; 717/106; 717/127

(58) Field of Classification Search .................. None
See application file for complete search history.

(56) References Cited

U.S. PATENT DOCUMENTS

| 7,130,885 | B2 * | 10/2006 | Chandra et al. ............... 709/206 |
| 7,246,256 | B2 * | 7/2007 | De La Cruz et al. ......... 714/4.11 |
| 2006/0047665 | A1 * | 3/2006 | Neil ............................... 707/10 |

* cited by examiner

*Primary Examiner* — Chuck Kendall

(57) ABSTRACT

A system is provided for environments sharing remote mounted middleware. The system includes a plurality of hosts, a remote storage, an application, a shared middleware, a dedicated middleware, and a plurality of environments. The shared middleware is stored on the remote storage and remote mounted on each of the plurality of hosts. The dedicated middleware, which is associated with the shared middleware, is stored on the remote storage and remote mounted on each of the plurality of hosts. Each of the plurality of environments is on one of the plurality of hosts. Each of the plurality of environments includes the remote mounted shared middleware and the remote mounted dedicated middleware. Each of the plurality of environments executes one of the plurality of applications.

11 Claims, 3 Drawing Sheets

ENVIRONMENTS SHARING REMOTE MOUNTED MIDDLEWARE

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

An application is computer software that employs the capabilities of a computer to perform a task for a computer user. Applications include computer executable code that is derived from computer source code files. An application may also include configuration files and support files for customizing the operation of the software.

Although the process of developing and testing applications for simple programs may consist of a single file being compiled, the computer source code for complex software may consist of many files that may be configured in different ways to produce application versions customized specifically for each environment in which the application may execute. The environment is the configuration of the hardware, operating system, and enabling programs in which an application executes. Therefore, development and testing of an application can require the creation of development and test environments that simulate the environments in which the application may execute. The process of creating development and test environments for each application is not only complicated and time consuming, often requiring weeks of intensive work, but is also a process that must be repeated for each occasion when the application is to be developed or tested.

SUMMARY

In some embodiments, a system is provided for environments sharing remote mounted middleware. The system includes a plurality of hosts, a remote storage, an application, a shared middleware, a dedicated middleware and a plurality of environments. The shared middleware is stored on the remote storage and remote mounted on each of the plurality of hosts. The dedicated middleware, which is associated with the shared middleware, is stored on the remote storage and remote mounted on each of the plurality of hosts. Each of the plurality of environments is on one of the plurality of hosts. Each of the plurality of environments includes the remote mounted shared middleware and the remote mounted dedicated middleware. Each of the plurality of environments executes one of the plurality of applications.

In other embodiments, a computer implemented method is provided for environments sharing remote mounted middleware. A first shared middleware and a first dedicated middleware are remote mounted to a host to create a first environment. An application is executed using the first environment. The first shared middleware and the first dedicated middleware are unmounted. A second shared middleware and a second dedicated middleware are remote mounted to the host to create a second environment. The application is executed using the second environment.

In some other embodiments, a computer implemented method is provided for environments sharing remote mounted middleware. A portion of middleware that changes during execution is identified as dedicated middleware. A portion of the middleware that is substantially unchanged during execution is identified as shared middleware. The shared middleware and the dedicated middleware are remote mounted to a host to create an environment for executing an application.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION OF THE PREFERRED EMBODIMENTS

Figure 1:
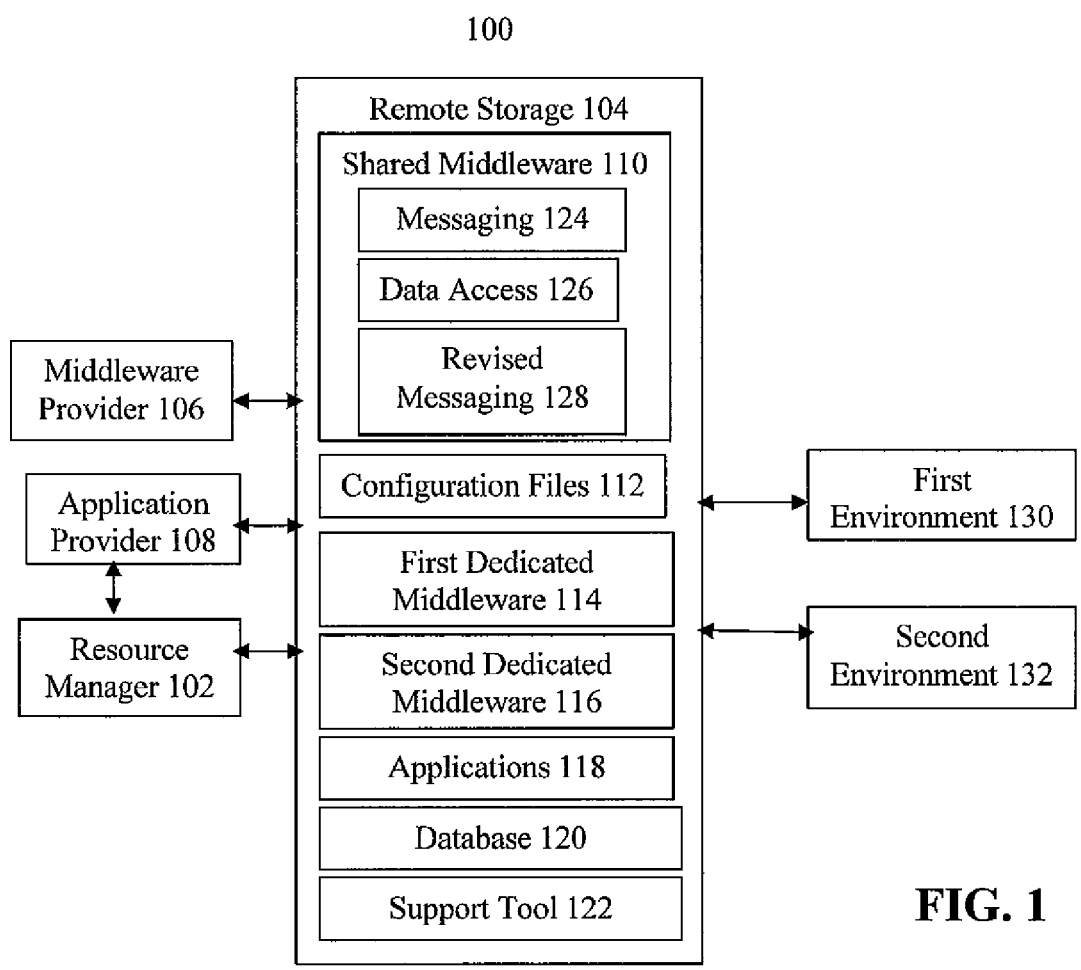
FIG. 1 illustrates a system for environments sharing remote mounted middleware according to some embodiments of the present disclosure.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

The embodiments of the present disclosure provide systems and methods for computing and/or processing environments sharing remote mounted middleware. In some contexts the word environment may refer to both a hardware system and a software system that together provide facilities for executing or processing one or more applications. In other contexts the word environment may specifically refer to the software system that promotes executing or processing one or more applications. Middleware is computer software used to enable and support complex applications such as web servers, application servers, content management systems, and similar tools. Examples of commercially available middleware include WEBLOGIC, ORACLE, and WEBSPHERE. Remote mounting is a process that connects a host server's file system to directories stored remotely on other machines so that the directories can be used as if the directories were all part of the host's file system.

The system includes multiple hosts, multiple applications, multiple environments, a remote storage, a shared middleware, and a dedicated middleware stored that is associated with the shared middleware. The shared middleware and the dedicated middleware are stored on the remote storage. Each of the hosts remote mounts the shared middleware and the dedicated middleware to create one of the environments for executing the applications. Because the middleware on the remote storage, which may also be referred to as a golden server in some contexts, is certified, when this middleware is remote mounted by the multiple hosts there is no need to certify the middleware again, which may promote considerable savings of time otherwise spent recertifying middleware and/or other software on each of the multiple hosts. The portions of the middleware that stay unchanged during execution are shared middleware and the portions of the middleware that change during execution are dedicated middleware. Multiple environments may simultaneously use only one copy of the unchanging portion of middleware for remote mounting and sharing. Each environment remote mounts to its own dedicated copy of the small portion of the middleware that changes during execution. Making one copy of only the small dedicated portions of middleware to create an environment may take only a few minutes, in contrast to the more lengthy process, for example perhaps hours, involved in copying the entire middleware for the environment and certifying the entire middleware.

In some embodiments, a host remote mounts a shared middleware and a dedicated middleware to create an environment for executing an application. The host may unmount the shared middleware and the dedicated middleware to prepare for the creation of another environment. The host may remote mount to another shared middleware and another dedicated middleware to create another environment for executing the application. Because mounting and unmounting remote middleware can be completed in less time than building the software environment of a host computer from scratch, such as a few seconds, a host can be quickly and repeatedly reconfigured to provide many different environments for executing the application.

Turning now to FIG. 1, a system 100 for environments sharing remote mounted middleware is depicted according to some embodiments of the present disclosure. The system 100 includes a resource manager 102, a remote storage 104, a middleware provider 106, and an application provider 108. The resource manager 102 can use middleware provided by the middleware provider 106 to configure middleware on the remote storage 104. The resource manager 102 can also remote mount various host servers to the middleware on the remote storage 104 to create various environments on the host servers. Additionally, the resource manager 102 can configure applications provided by the application provider 108 on the remote storage 104, and control execution of the applications on the environments created on the host servers.

Although the resource manager 102 may be described as making selections or executing actions, the resource manager 102 may be used by a user that actually makes the selections or executes the actions. Furthermore, some of the actions might be accomplished automatically by the resource manager 102 and some actions might be made by the user, such as executing an application on an environment, for example. In some embodiments, these actions may be accomplished partially by the user and partially by the resource manager 102.

The remote storage 104 can store middleware for remote mounting by host servers. The middleware provider 106 can provide middleware to the remote storage 104 and certify that the provided middleware has been stored correctly. The application provider 108 can provide applications to the remote storage 104 for execution on various environments.

Figure 5:
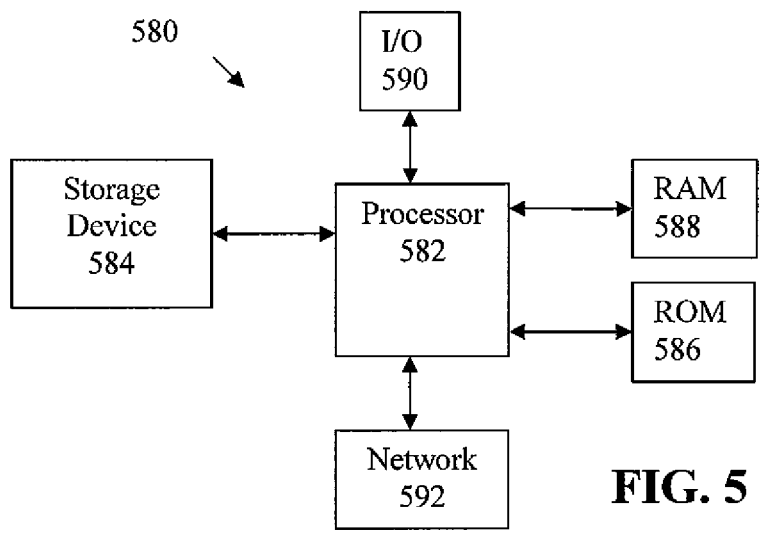
FIG. 5 illustrates an exemplary general purpose computer system suitable for implementing the several embodiments of the disclosure.

Although the system 100 depicts one instance each of the resource manager 102, the remote storage 104, the middleware provider 106, and the application provider 108, the system 100 can have any number of instances of these or any other types of components. The system 100 may be implemented using a general purpose computer which is depicted in FIG. 5 and described hereinafter.

The remote storage 104 can store shared middleware 110, configuration files 112, a first dedicated middleware 114, a second dedicated middleware 116, applications 118, a database 120, and a support tool 122. The shared middleware 110 includes portions of middleware that are substantially unchanged during execution, such as a messaging 124 middleware portion, a data access 126 middleware portion, and a revised messaging 128 middleware portion. Although the system 100 depicts three instances of shared middleware portions 124-128 and two instances of dedicated middleware portions 114-116, the system 100 can have any number of instances of these or any other types of middleware portions. In this example, the revised messaging 128 middleware portion can be an updated version of the messaging 124 middleware portion. The configuration files 112 can include data used to customize the applications 118 for execution on various environments, data such as database connections. The shared middleware 110 can be remote mounted by hosts to create environments for executing the applications 118, such as a first environment 130 and a second environment 132. Although the system 100 depicts two instances of environments 130-132, the system 100 can have any number of instances of these or any other types of environments. For example, a first host can remote mount the messaging 124 middleware portion to create the first environment 130 for executing an application, while a second host can remote mount the data access 126 middleware portion to create the second environment 132 for executing the same application or another application.

The first host can also remote mount the first dedicated middleware 114, which can be the portion of a messaging middleware that changes during execution, to create the first environment 130. The second host can also remote mount the second dedicated middleware 116, which can be the portion of a data access middleware that changes during execution, to create the second environment 132.

In this example, the first environment 130 is remote mounted to the messaging 124 middleware portion that is substantially unchanged during execution and remote mounted to the first dedicated middleware 114 portion that can be the portion of the messaging middleware that changes during execution. If the second environment 132 is created to execute applications in an environment identical to the first environment 130, the second environment 132 can also be remote mounted to the same messaging 124 middleware portion to which the first environment 130 is remote mounted. Alternatively, the second environment 132 can also be remote mounted to its own copy of the messaging 124 middleware portion. However, in this example the second environment 132 is remote mounted to the second dedicated middleware 116, not the first dedicated middleware 114 portion to which the first environment 130 is remote mounted. Even though each of the environments 130-132 may or may not share the same shared middleware portion, each of the environments 130-132 has its own dedicated middleware portion.

The applications 118 are the set of the applications provided by the application provider 108 for executing on the environments 130-132. The database 120 is storage for the applications 118 to use when executed on the environments 130-132. The support tools 122 can control an application, a database, and an environment for an application during execution of the application. For example, the support tools 122 can include a user interface by which a user monitors execution of an application on the first environment 130 and the data stored in the database 120 during execution of the application.

Figure 2:
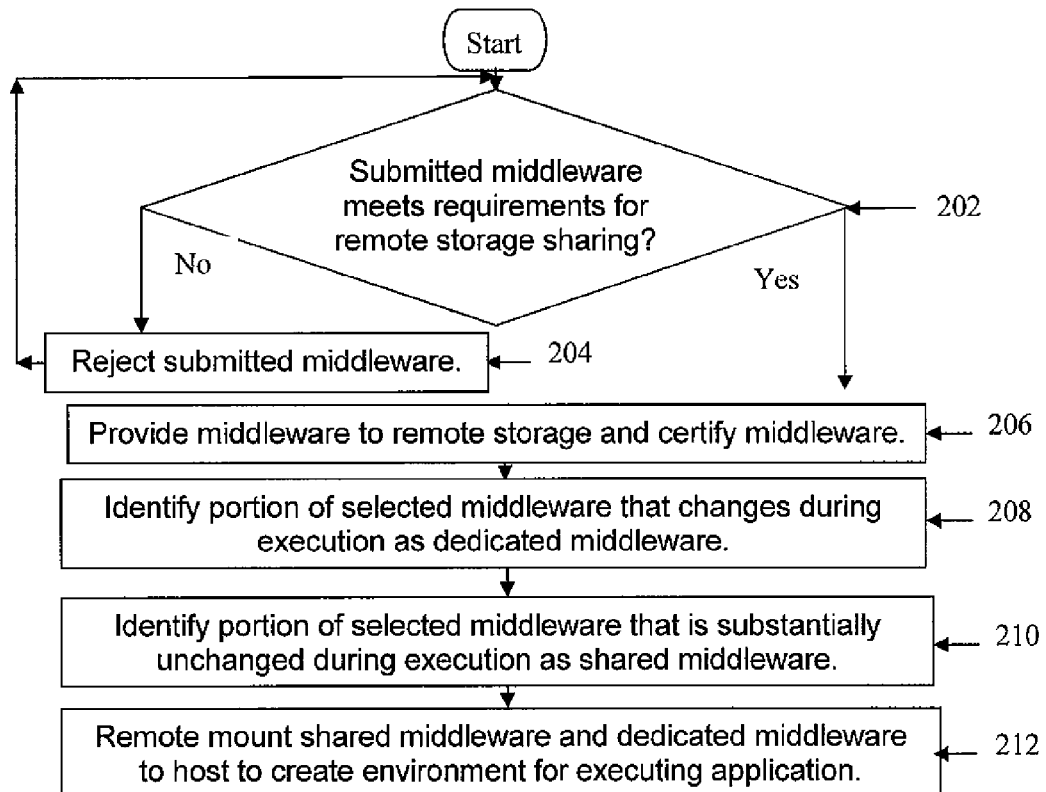
FIG. 2 is a flow chart of a method for environments sharing remote mounted middleware according to some embodiments of the present disclosure.

Turning now to FIG. 2, a flow chart depicts a method for environments sharing remote mounted middleware according to some embodiments of the present disclosure. The method can be executed to provide middleware to the remote storage 104, identify a portion of the middleware that changes during execution as dedicated middleware, identify a portion of the middleware that is substantially unchanged during execution as shared middleware, and remote mount the middleware to create an environment for executing an application.

In box 202, whether submitted middleware meets requirements for remote storage sharing is determined. For example, the middleware provider 106 determines whether submitted messaging middleware meets requirements for remote storage sharing by multiple environments. In one example, if the submitted middleware requires that a component be installed on a host when the middleware is configured for the host, the submitted middleware may not meet requirements for remote storage sharing. For example, both the MICROSOFT WINDOWS operating system and the MAC OS operating system require that a component be installed on a host when the middleware is configured for the host, which prevents the host from accessing the middleware via remote mounting only. In contrast, the UNIX operating system and the LINUX operating system do not require that a component be installed on a host when the middleware is configured for the host, which enables the host to access the middleware via remote mounting. If the submitted middleware does not meet requirements for remote storage sharing, the method continues to box 204. If the submitted middleware meets requirements for remote storage sharing, the method proceeds to box 206.

In box 204, the submitted middleware is rejected. For example, the middleware provider 106 rejects the submitted middleware as unsuitable for remote storage sharing because the middleware requires a component to be installed on a host when the middleware is configured for the host. After rejecting the submitted middleware, the method returns to box 202 to determine whether other submitted middleware meets requirements for remote storage sharing.

In box 206, middleware is provided to remote storage and the middleware is certified. For example, the middleware provider 106 provides messaging middleware to the remote storage 104, and the middleware provider 106 certifies that the provided middleware is stored correctly on the remote storage 104 to insure that no errors were introduced in the messaging middleware during the storage process. The certification process for the entire middleware may be only required once for the entire middleware when the middleware is provided to the remote storage 104. In contrast, methods that copy the middleware to the host each time an environment is created require the middleware to be certified every time the middleware is copied to the host.

In box 208, a portion of middleware that changes during execution is identified as dedicated middleware. A portion of the middleware is a series of the middleware's distinct files. For example, the middleware provider 106 identifies a portion of messaging middleware that changes during execution as the first dedicated middleware 114. The portion of middleware that changes can be identified by operating with multiple copies of the middleware in different environments and then comparing the multiple copies to determine what portions remained the same and what portions changed. The portions of middleware that change can include the configurable portions that specify a host name, ports, and a database connection. For example, an application may require a connection to a database.

In box 210, a portion of middleware that is substantially unchanged during execution is identified as shared middleware. For example, the middleware provider 106 identifies a portion of the messaging middleware that is substantially unchanged during execution as the messaging 124 middleware portion. The middleware provider 106 may identify a portion of middleware that is substantially unchanged by checking the change date for each of the middleware's distinct files for post-installation changes. If the middleware provider 106 determines that a portion of the middleware has no post-installation change date, the middleware provider 106 identifies that portion of the middleware as the shared middleware 110.

In box 212, shared middleware and dedicated middleware are remote mounted to a host to create an environment for executing an application. For example, the resource manager 102 remote mounts shared middleware 110, such as the messaging 124 middleware portion, and the first dedicated middleware 114 to a server to create the first environment 130 for executing an application. Remote mounting middleware to a host can include mapping from the remote storage 104 to the host by exporting middleware from the remote storage 104 to the host. Remote mounting can also include executing any additional tasks required to configure the host as the desired environment.

Before the middleware is remote mounted, the resource manager 102 can select the remote storage 104 instead of other remote storages because the remote storage 104 stores the messaging middleware 124 required to create the first environment 130. The resource manager 102 can also select the host server to be used for creating the first environment 130. The host server already includes an operating system, such that the host requires access only to middleware and applications to create the first environment 130.

Figure 3:
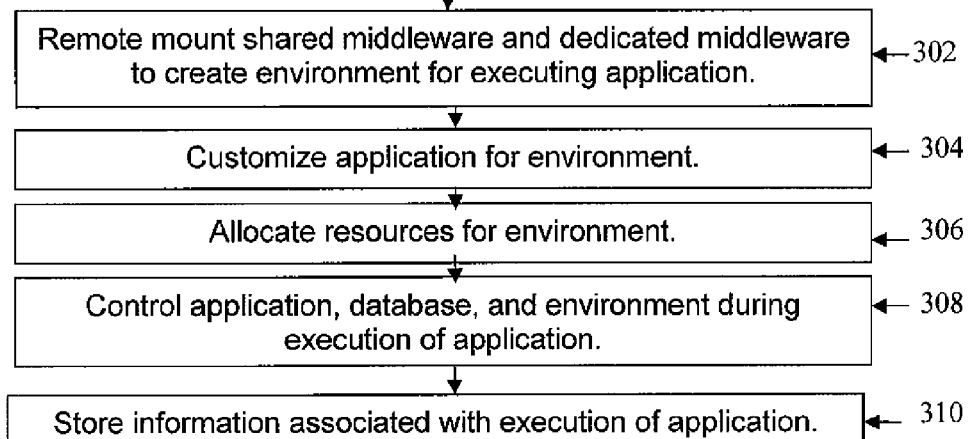
FIG. 3 is a flow chart of another method for environments sharing remote mounted middleware according to some embodiments of the present disclosure.

Turning now to FIG. 3, a flow chart depicts a method for environments sharing remote mounted middleware according to some embodiments of the present disclosure. Executing the method enables the creation of environments for executing applications.

In box 302, shared middleware and dedicated middleware are remote mounted to create an environment for executing an application. For example, the resource manager 102 remote mounts the shared middleware 110, such as the messaging 124 middleware portion, and the first dedicated middleware 114 to a host server to create the first environment 130 for executing an application. The resource manager 102 may also remote mount the same messaging 124 middleware portion and the second dedicated middleware 116 to another host server to create the second environment 132 for executing an application. Alternatively, the resource manager 102 may also remote mount a copy of the messaging 124 middleware portion and the second dedicated middleware 116 to another host server to create the second environment 132 for executing an application. The created environment can be a test environment, a development environment, or a production environment. A development environment can be the minimal environment required for developing an application, whereas the test environment can be the environment used for testing the functioning of the application within the context of a simulated production environment. The production environment can be the environment for executing the application after operation of the application is approved. Additionally, the environment can be a single server, a group of servers, or a cluster of servers.

In box 304, an application is customized for an environment. For example, the resource manager 102 uses the configuration files 112 to customize an application for execution on the first environment 130, and may also use the configuration files 112 to customize another application for execution on the second environment 132.

In box 306, resources are allocated for the environment. For example, the resource manager 102 allocates resources for the first environment 130, including resources such as software, hardware, and network elements, so that the first environment 130 simulates a production environment for the application. The resource manager 102 may also allocate resources for the second environment 132. After the application is executed on the environment, the resources may be deallocated from the host.

In box 308, an application, a database, and an environment are controlled during execution of the application. For example, the support tools 122 enable a user to control the application, the database 120, the first environment 130, and the second environment 132 during execution of the applications. The first environment 130 and the second environment 132 may simultaneously access the same shared middleware 110, or each environment may access its own copy of the shared middleware 110.

In box 310, information associated with execution of the application is stored. For example, the support tools 122 could also store information associated with execution of the applications in the database 120, information that can enable a user to test the applications.

Figure 4:
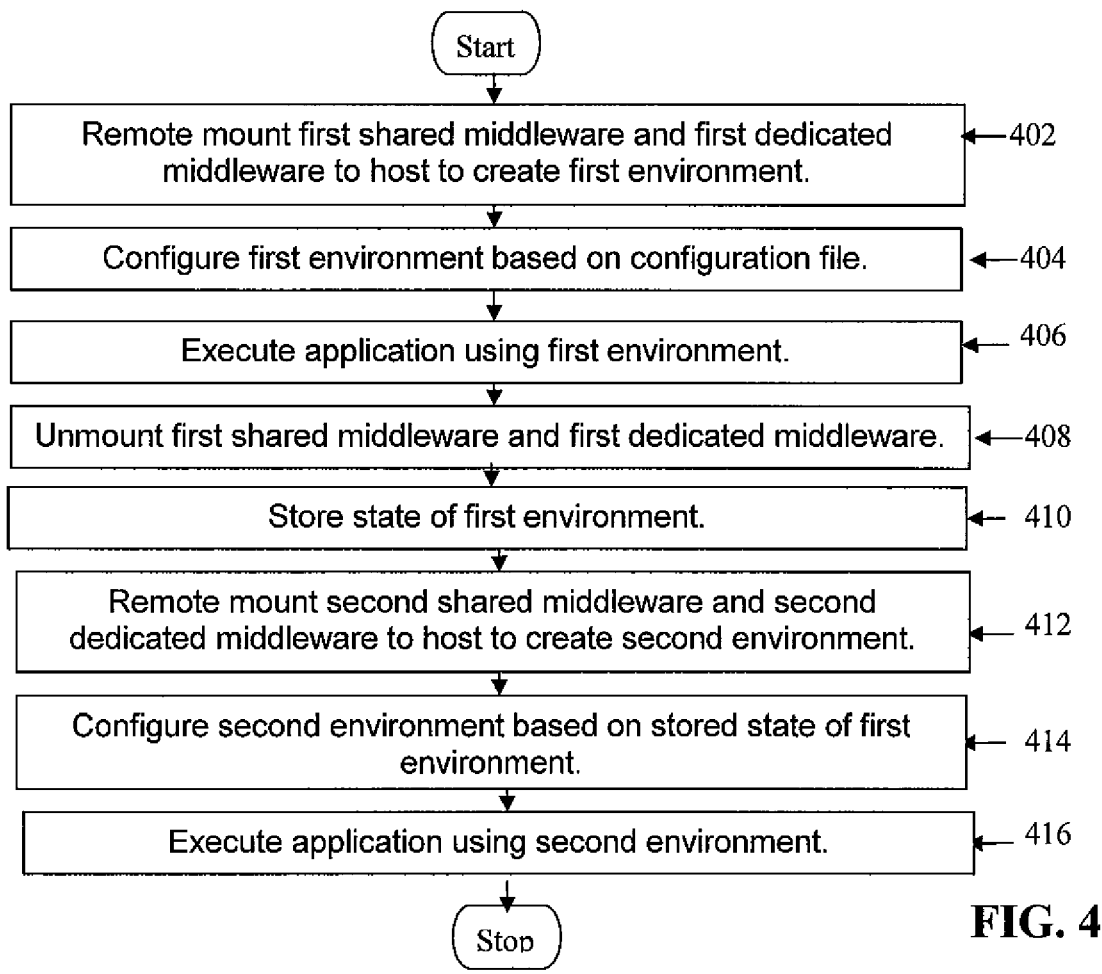
FIG. 4 is a flow chart of yet another method for environments sharing remote mounted middleware according to some embodiments of the present disclosure.

Turning now to FIG. 4, a flow chart depicts a method for environments sharing remote mounted middleware according to some embodiments of the present disclosure. Executing the method enables execution of an application on one environment, the quick creation of another environment on a different host, and the execution of the application on the other environment In box 402, a first shared middleware and a first dedicated middleware are remote mounted to a host to create a first environment. For example, the resource manager 102 remote mounts the first shared middleware, such as the messaging 124 middleware portion, to a host server to create the first environment 130 by accessing a read only portion of the remote storage 104. Because the first environment 130 can only read the shared middleware 110, the first environment 130 cannot inadvertently corrupt the shared middleware 110, which may be used simultaneously by other environments. In this example, the resource manager 102 also remote mounts the first dedicated middleware 114 to the host server to create the first environment 130 by accessing a read-write portion of the remote storage 104. The first environment 130 can write to the first dedicated middleware 114 because the first dedicated middleware 114 is created for the exclusive use of the first environment 130. The first environment 130 is the only environment that can inadvertently corrupt the first dedicated middleware 114, which may indicate a problem attributed only to the application executing on the first environment 130. The resource manager 102 remote mounts middleware by using, for example, the network file system protocol, a protocol that allows a user on a host server to access files over a network as if the files were attached to its local disks.

In box 404, the first environment is configured based on a configuration file. For example, the resource manager 102 configures the first environment 130 based on the configuration files 112, which can specify the resources for allocation to the first environment 130.

In box 406, the application is executed using the first environment. For example, the resource manager 102 executes the application using the first environment 130, which is configured to simulate the production environment for the application.

In box 408, the first shared middleware and the first dedicated middleware are unmounted. For example, the resource manager 102 unmounts the first shared middleware, such as the messaging 124 middleware portion, and the first dedicated middleware 114 from the host server, to prepare the host server for the creation of another environment.

In box 410, a state of the first environment is stored. For example, the resource manager 102 stores the state of first environment 130. Storing the state of an environment enables the quick re-creation of the application, the shared middleware, the dedicated middleware, the data, and the conditions of the environment at the time the state is stored.

In box 412, a second shared middleware and a second dedicated middleware are remote mounted to the host to create a second environment. For example, the resource manager 102 remote mounts a second shared middleware, such as the revised messaging 128 middleware portion, and the second dedicated middleware 116 to the host server to create the second environment 132. Although depicted in FIG. 1 as an environment on a separate host from the first environment 130, the second environment 132 can also be created on the same host used for creating the first environment 130. In this example, the resource manager 102 replaces one environment based on messaging middleware with another environment based on an updated version of the messaging middleware, thereby quickly enabling the application to be tested on different versions of the same middleware.

In box 414, the second environment is configured based on a stored state of the first environment. For example, the resource manager 102 configures the second environment 132 based on the stored state of the first environment 130.

In box 416, the application is executed using the second environment 132. For example, the resource manager 102 executes the application using the second environment 132, thereby testing the application on various versions of the same messaging middleware. Testing the same application on different versions of the same middleware can insure that the application can execute properly on different versions of the same production environment. Additionally, the same application can be tested on environments based on different types of middleware to insure that the application can execute properly on different production environments.

The system described above may be implemented on any general-purpose computer with sufficient processing power, memory resources, and network throughput capability to handle the necessary workload placed upon it. FIG. 5 illustrates a typical, general-purpose computer system suitable for implementing one or more embodiments disclosed herein. The computer system 580 includes a processor 582 (which may be referred to as a central processor unit or CPU) that is in communication with memory devices including the storage device 584, read only memory (ROM) 586, random access memory (RAM) 588, the input/output (I/O) devices 590, and network connectivity devices 592. The processor may be implemented as one or more CPU chips.

The storage device 584 is typically comprised of one or more disk drives or tape drives and is used for non-volatile storage of data and as an over-flow data storage device if the RAM 588 is not large enough to hold all working data. The storage device 584 may be used to store programs which are loaded into the RAM 588 when such programs are selected for execution. The ROM 586 is used to store instructions and perhaps data which are read during program execution. The ROM 586 is a non-volatile memory device which typically has a small memory capacity relative to the larger memory capacity of secondary storage. The RAM 588 is used to store volatile data and perhaps to store instructions. Access to both the ROM 586 and the RAM 588 is typically faster than to the storage device 584.

The I/O devices 590 may include printers, video monitors, liquid crystal displays (LCDs), touch screen displays, keyboards, keypads, switches, dials, mice, track balls, voice recognizers, card readers, paper tape readers, or other well-known input devices, such as graphic user interfaces. The network connectivity devices 592 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity devices 592 may enable the processor 582 to communicate with an Internet or one or more intranets. With such a network connection, it is contemplated that the processor 582 might receive information from the network, or might output information to the network in the course of performing the above-described method steps. Such information, which is often represented as a sequence of instructions to be executed using the processor 582, may be received from and outputted to the network, for example, in the form of a computer data signal embodied in a carrier wave.

Such information, which may include data or instructions to be executed using the processor 582 for example, may be received from and outputted to the network, for example, in the form of a computer data baseband signal or signal embodied in a carrier wave. The baseband signal or signal embodied in the carrier wave generated by the network connectivity devices 592 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embodied in the carrier wave, or other types of signals currently used or hereafter developed, referred to herein as the transmission medium, may be generated according to several methods well known to one skilled in the art.

The processor 582 executes instructions, codes, computer programs, scripts which it accesses from hard disk, floppy disk, optical disk (these various disk based systems may all be considered storage device 584), the ROM 586, the RAM 588, or the network connectivity devices 592.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A computer implemented method for environments sharing remote mounted middleware, comprising:
   remote mounting a first shared middleware and a first dedicated middleware to a host to create a first environment;
   executing an application using the first environment;
   unmounting the first shared middleware and the first dedicated middleware;
   remote mounting a second shared middleware and a second dedicated middleware to the host to create a second environment; and
   executing the application using the second environment.

2. The computer implemented method of claim 1, further comprising configuring the first environment based on a configuration file.

3. The computer implemented method of claim 1, further comprising storing a state of the first environment.

4. The computer implemented method of claim 3, further comprising configuring the second environment based on the stored state of the first environment.

5. The computer implemented method of claim 1, wherein remote mounting the first shared middleware to the host comprises accessing a read-only portion of a remote storage.

6. The computer implemented method of claim 1, wherein remote mounting the first dedicated middleware to the host comprises accessing a read-write portion of a remote storage.

7. The computer implemented method of claim 1, wherein remote mounting comprises using network file system protocol.

8. A computer implemented method for environments sharing remote mounted middleware, comprising:
   identifying a portion of middleware that changes during execution as dedicated middleware;
   identifying a portion of the middleware that is substantially unchanged during execution as shared middleware; and
   remote mounting the shared middleware and the dedicated middleware to a host to create an environment for executing an application.

9. The computer implemented method of claim 8, further comprising:
   determining whether a submitted middleware satisfies requirements for remote storage sharing; and
   rejecting the submitted middleware in response to determining that the submitted middleware does not satisfy the requirements for remote storage sharing.

10. The computer implemented method of claim 8, further comprising selecting a remote storage corresponding to the middleware.

11. The computer implemented method of claim 8, further comprising providing middleware to the remote storage and certifying the middleware.

* * * * *